United States Patent [19]

Patterson et al.

[11] Patent Number: 5,103,544
[45] Date of Patent: Apr. 14, 1992

[54] IMPACT TOOL FOR REMOVING CONSTANT VELOCITY JOINT

[76] Inventors: Darold R. Patterson, 18209 Hollingsworth Dr., Rockville, Md. 20855; Ricky R. Patterson, 7360 NW. 36th St., Ft. Lauderdale, Fla. 33319

[21] Appl. No.: 614,222

[22] Filed: Nov. 16, 1990

[51] Int. Cl.⁵ .............................................. B25B 27/14
[52] U.S. Cl. ........................................................ 29/275
[58] Field of Search .................... 29/254, 255, 275; 81/463

[56] References Cited

U.S. PATENT DOCUMENTS

| | | | |
|---|---|---|---|
| 2,089,902 | 8/1937 | Kulp | 29/275 |
| 2,292,898 | 8/1942 | Peirce | 29/275 |
| 3,208,134 | 9/1965 | Krewson | 29/275 |
| 4,868,966 | 9/1989 | Campbell et al. | |
| 4,903,882 | 2/1990 | Long | 29/275 |
| 4,926,537 | 5/1990 | Pool | |
| 4,936,003 | 6/1990 | Gloe | |

*Primary Examiner*—Robert C. Watson
*Attorney, Agent, or Firm*—Hoffman, Wasson & Gitler

[57] ABSTRACT

An impact tool for removing a constant velocity joint from a splined drive shaft is disclosed. The tool is a cast metal member comprising a lower shank, a central shaft, and a cup-shaped head. In use, the shank is inserted into an air hammer, and the cup-shaped head is placed over the drive shaft and in contact with a trunnion located within the open end of the constant velocity joint. The air hammer, when operated, delivers a significant impact force, through the tool, to the trunnion and separates the constant velocity joint from the drive shaft.

2 Claims, 1 Drawing Sheet

IMPACT TOOL FOR REMOVING CONSTANT VELOCITY JOINT

BACKGROUND OF THE INVENTION

1. Field of the Invention

The present invention relates generally to a simple tool for removing a constant velocity joint from a splined shaft. More specifically, the present invention contemplates an impact tool, that is powered by a conventional pneumatic hammer, to deliver an axially directed force of sufficient magnitude to separate a constant velocity (CV) joint from a splined shaft.

Constant velocity, or CV, joints are widely used, as in front-drive automobiles, to transmit uniform rotary motion from one shaft to another, while permitting the shafts to be disposed at varying angles. The constant velocity joints are usually located between the drive axle and the hub for mounting each front wheel of the vehicle. The constant velocity joint insures the transmittal of motive power to each of the front wheels of the vehicle.

The constant velocity joint includes a bell-shaped housing with an axially extending stub shaft. The stub shaft is operatively associated with the hub for one of the front wheels of the vehicle. The larger end of the bell-shaped housing opens outwardly and has several axially extending recesses formed therein. A trunnion with radial arms fits into the open end of the bell-shaped housing, and case hardened ball bearings fit into the channels defined between the axial recesses in the housing and the valleys between the arms of the trunnion. An annular bearing cage, with axial slots, fits between the interior of the housing and the trunnion; the ball bearings are limited in their travel by the axial slots in the bearing cage. The hub of the trunnion defines a splined receptacle that receives complementary splines on a drive shaft.

The drive shaft usually has an annular groove formed adjacent to the end of the shaft which will be inserted into the bell-shaped housing of the constant velocity joint. The drive shaft has axially extending splines adjacent to one end; such splines are complementary to the splines defined in the hub of the trunnion. A circular clip is seated in the groove, and the drive shaft is forced into engagement with the hub of the trunnion. The circular clip maintains the drive shaft and trunnion locked together, and the clip can only be overcome by the application of a considerable amount of force.

A rubberized boot extends axially from the open end of the housing and projects over the drive shaft. Grease is retained within the boot, and lubricates the connection between the drive shaft and the constant velocity joint. The connection is subjected to diverse stresses and strains, and effective lubrication is essential to the proper functioning of the constant velocity joint.

The boot, because of its exposed location on an automobile, may be punctured, may be attacked by climatic and road conditions, or may simply wear out after extended use. At such time, as a minimum, the boot must be replaced, and, in many nstances, the joint must be repaired. In order to effectuate the necessary replacement and/or repair, the drive shaft and the constant velocity joint must be disassembled. Herein lies the crux of the problem.

Presently, the drive shaft and the constant velocity joint are removed, as an assembly, from the vehicle utilizing same. The drive shaft is then clamped in a vise, and the joint is then struck, repeatedly, by heavy hammers. After several blows have been delivered, the circular clip is destroyed, and the constant velocity joint and drive shaft can be separated. The constant velocity joint can then be serviced, as needed.

After servicing, the constant velocity joint and drive shaft are re-united, and the assembly is re-mounted on the automobile. Even skilled mechanics, addressing this problem on a daily basis, may take two, or more hours, to remove the assembly, place same in a vise, and separate the constant velocity joint from the drive shaft. After repair and/or replacement, at least one-half an hour will be consumed to replace the assembly.

Furthermore, the current separation technique relies upon the brutalization of the joint with heavy hammers, and the punishment inflicted upon the joint ma well diminish its useful life. Also, unless the hammers are utilized with a considerable degree of skill, the circular clip, or similar fasteners, will resist destruction for prolonged periods of time.

One proposed solution to the time consuming, and difficult, problem of mounting, and de-mounting, splined joints for automobiles, is set forth in U.S. Pat. No. 4,936,003, granted June 26, 1990, to C. Wayne Gloe. Such patent discloses several embodiments of a special tool, such as tool [30] (FIGS. 1-4) which can be inserted into the internally splined wheel hub [16] rotatably fixed to the vehicle, and which screws onto one end of the externally splined drive shaft [14] being installed in the hub. The other end [60] of the tool mounts to a slide hammer [40]. When the slide hammer weight [46] is banged against the tool or against the oppositely located hammer stop [48], the momentum impulse is transmitted to the splined shaft to push it out of, or into, the splined wheel hub, depending upon the direction of the movement of hammer weight. The tool is capable of handling interference fit splined joints, that previously required large press forces for assembly or disassembly, as noted in column 6, lines 64, column 7, line 22.

While Gloe provides one solution to the problem of expeditiously removing a constant velocity joint from a drive shaft, Gloe relies upon a slide hammer, and accurate manipulation thereof, to separate the CV joint and drive shaft operatively associated therewith. The special tool envisioned in Gloe must be threaded into engagement with the threads on the extension of the stub shaft projecting from the constant velocity joint. Also, the splined section of the stub shaft, that is situated inboard of the threaded extension [15], should be supported by, or engaged with, the hub [16]. Also, since a threaded connection must be established between the special tool and the threaded extension of the constant velocity joint, the special tool will not be suited for use on joints with extensions of varying sizes. The joints used on different vehicles vary in size, from manufacturer to manufacturer, to further compound the problem.

SUMMARY OF THE INVENTION

In contrast to the known techniques for removing constant velocity joints from engagement with splined shafts, such as drive shafts, the instant invention discloses a unique removal tool that is configured for use with air hammers. Since pressurized air lines, and air hammers, are invariably available in every automotive repair shop, the utilization of air hammers, as the power source for removing constant velocity joints, holds significant appeal. The unique removal tool is readily manufactured, and may be produced, at relatively low cost, and yet be long lived.

Also, the present removal tool delivers sharp, axially directed impact forces to the components retained in the open end of the bell-shaped housing for the constant velocity joint, and more particularly, to a trunnion in said housing. Such force disengages the splines on the hub of the trunnion from the complementary splines on the drive shaft, so that the constant velocity joint can be removed therefrom for repair and/or replacement. The present tool achieves the desired disengagement in a matter of a few minutes, and without removal of the constant velocity joint and drive shaft from the automobile.

The present tool assumes the form of a cup-shaped head, an elongated shaft, and a depending shank. A tapered collar separates the shank to be inserted into the air hammer from the central shaft of the tool. A cup-shaped head conforms to the curvature of the trunnion, so that an impact force, from the air hammer, can be delivered to the joint over a wide contact area, with maximum effectiveness.

The present invention recognizes that constant velocity joints are not standardized in dimension, and thus vary from automobile to automobile. Consequently, in order to have a set of joint removing tools that will satisfactorily service every make and model, a set of three or four tools is contemplated, which would accommodate different sized axles. Since the instant cup-shaped tools will be relatively inexpensive, even a set of three or four tools would be within the financial reach of all interested mechanics or handymen.

Furthermore, to facilitate the utilization of the present invention, which may be used from the garage floor when the automobile to be serviced is raised on a lift, the shaft is tapered away from the head, at a slight angle. The angle may be approximately 6° below a horizontal plane passed through the head of the tool.

Additional operational advantages presented by the instant removal tool may occur to the skilled artisan, when the appended drawings are construed in harmony with the ensuing specification.

DESCRIPTION OF THE PREFERRED EMBODIMENT

Figure 1:
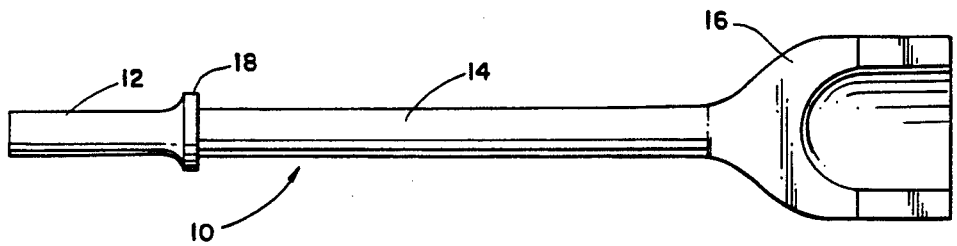
FIG. 1 is a top plan view of a joint removal tool constructed in accordance with the principles of the present invention.
Figure 2:
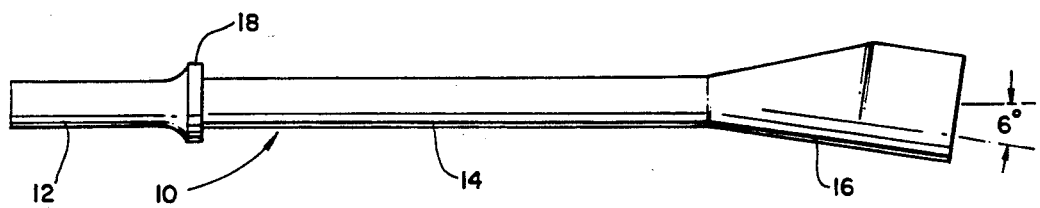
FIG. 2 is a side elevational view of the tools shown in FIG. 1.

FIGS. 1 and 2 show the unique joint removal tool 10 constructed in accordance with the principles of the present invention. Tool 10 is integrally formed as a metal casting, and may be worked-hardened, or otherwise finished, to insure a long, useful life.

Tool 10 comprises a shank 12, a shaft 14, and a cup-shaped head 16. A tapered collar 18 is formed between shank 12 and shaft 14. While the size of the tool is not critical, in one illustrative prototype, the shank 12 is 0.400 inches in diameter and one and three-sixteenth inches in length; collar 18 tapers from 0.400 to 0.754 inches; shaft 14 is 0.500 inches in diameter and five and five-sixteenths inches in length. Head 16 has a one inch tapered segment that leads into a uniform section of a one and a half inches in length. Tool 10 thus measures nine and a half inches in length, and head 16 has an outer diameter of one and three quarter inches, and an inner diameter of one and one quarter inches. Head 16 is cup-shaped, and is configured to fit against a trunnion located within the constant velocity joint. As shown in FIG. 2, head 16 extends slightly downwardly an angle that approximates 6° with respect to a horizontal plane passing through the shank and shaft of the tool 10. While 6° is not a critical angle, such angle has been found to be beneficial in positioning the cup-shaped head 16 in alignment with the desired component within the constant velocity (CV) joint 20.

Figure 3:
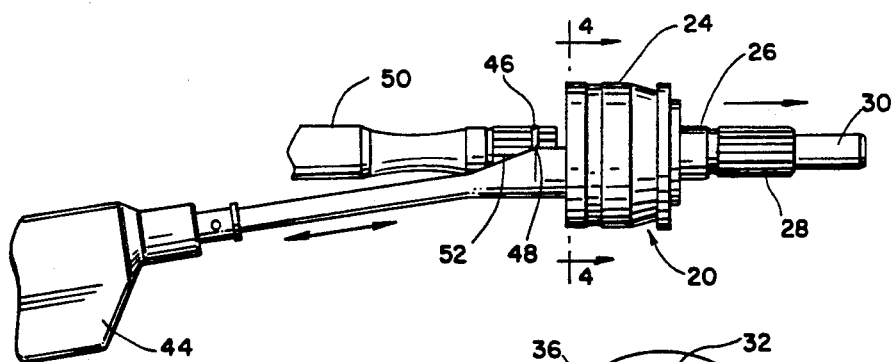
FIG. 3 is a side elevational view of the tool separating a constant velocity joint and a drive shaft, the tool being mounted in an air hammer.
Figure 4:
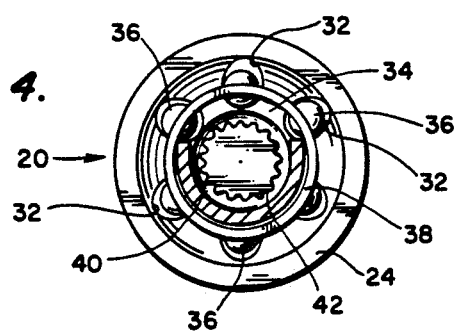
FIG. 4 is a front elevational view of the constant velocity joint shown in FIG. 3, such view being taken along line 4—4 and in the direction indicated.

As shown in FIGS. 3 and 4, tool 10 is employed to separate constant velocity joint 20 from engagement with drive shaft 22. Joint 20 includes a bell-shaped housing 24, with a stub shaft 26 projecting axially outwardly from the closed end of the housing. Stub shaft 26 has axially extending splines 28 formed thereon, and the remote end of the shaft has threads 30. The threads 30 may be engaged with a drive assembly (not shown) for the front wheel of an automobile.

The larger end of the bell-shaped housing 24 opens outwardly and has axially extending recesses 32 formed therein. A trunnion 34, with radially extending arms, fits into the housing, and case hardened ball bearings 36 fit into the channels defined between the axial recesses in the housing and the valleys between the arms of the trunnion. An annular bearing cage 38, with axial slots, fits between the interior of housing 24 and the trunnion 34. An internal hub 40, with axial splines 42, is formed as part of trunnion 34.

Head 16 of tool 10 is cup-shaped, as noted previously, and is sized to fit within cage 38 and bear against trunnion 34 in the vicinity of hub 40. The trunnion is situated at the open end of the bell-shaped housing of the constant velocity joint.

After the head 16 has been properly positioned, significant impact forces are delivered to the constant velocity joint, in the vicinity of hub 40 of the trunnion 34, by air hammer 44, which is shown in a fragmentary fashion. The impact forces act in the direction indicated schematically by the double-headed direction arrow in FIG. 3. The repeated impacts of the tool 10 upon the trunnion 34 of the constant velocity joint 20 overcome the retaining power of circular clip 46 that fits within groove 48 adjacent one end of drive shaft 48. The splines 52 are complementary in shape, and location, to the splines 42 on the interior hub of trunnion 34.

Initially, constant velocity joint 20 and drive shaft 50 are forced together into a tight fit, and clip 46 retains the assembly together. Only when the clip is compromised, can the joint 20 and drive shaft be separated for replacement or repair.

A rubberized, protective boot (not shown) normally extends axially over the intersection of drive shaft 50 and constant velocity joint 20. The boot is usually retained in position about the periphery of the bell-shaped housing by circular clamps (not shown) that are tightened toward the exterior of the housing and retain the boot in fixed relationship to the housing. When the boot is punctured or otherwised breached, the lubricating grease is flung outwardly by the centrifugal forces generated in the constant velocity joint. Consequently, the boot must be removed to expose the joint 20, and the unique tool 10 may then be utilized, in cooperation with air hammer 44, to disconnect drive shaft 50 from the splines 42 on hub 40 of trunnion 34 within constant velocity joint 20.

While a preferred embodiment of the unique joint removing tool 10 has been disclosed in great detail, numerous modifications may occur to the skilled artisan. For example, the head 16 might be formed as a separate member that could be joined to the shaft by a screw connection. In such fashion, a set of replaceable heads, of slightly different size, could be used with a single shaft to service the entire range of sizes of constant velocity joints used on different vehicles. Consequently, the appended claims should not be limited to their literal terms, but should be construed broadly in a manner commensurate with the significant breadth and scope of the invention.

We claim:

1. A tool designed exclusively for separating a constant velocity joint from engagement with a drive shaft with external, axially extending splines, said joint including a housing that is open at one end, a trunnion located within said opening, said trunnion having a central hub with axial splines that complement the splines on the drive shaft, said tool consisting of a unitary metal member including a lower shank, a central shaft, and an upper head, a tapered collar separating said shank from said shaft, said collar being adapted to facilitate seating of said tool in an air hammer, said head being U-shaped when viewed in end elevation and adapted to fit about the drive shaft, the dimensions of said U-shaped head being selected to contact the trunnion over a large area, said tool being sufficiently rugged to deliver impact forces from an air hammer to said trunnion to disengage the splined interconnection between the trunnion and drive shaft of a constant velocity joint.

2. A tool as defined in claim 1 wherein said head is offset at a 60° angle to said shank and shaft.

* * * * *